United States Patent [19]

Keys

[11] Patent Number: 4,976,068

[45] Date of Patent: Dec. 11, 1990

[54] REPOSITIONING DEVICE FOR A WEATHER SEAL

[75] Inventor: James F. Keys, West Bloomfield, Mich.

[73] Assignee: The Standard Products Company, Cleveland, Ohio

[21] Appl. No.: 424,160

[22] Filed: Oct. 19, 1989

[51] Int. Cl.⁵ .......................................... F24C 15/02
[52] U.S. Cl. ........................................ 49/482; 49/485; 49/495
[58] Field of Search ................. 49/482, 485, 490, 491, 49/495-497, 500

[56] References Cited

U.S. PATENT DOCUMENTS

| | | | |
|---|---|---|---|
| 1,566,651 | 12/1925 | Christensen . | |
| 2,655,698 | 10/1953 | Chalik et al. . | |
| 3,038,217 | 6/1962 | Harris | 49/482 X |
| 3,079,653 | 3/1963 | Cornell . | |
| 3,131,441 | 5/1964 | Cornell . | |
| 4,318,249 | 3/1982 | Landreth | 49/485 X |
| 4,474,402 | 10/1984 | Shelton | 49/485 X |
| 4,496,186 | 1/1985 | Tuchiya et al. | 49/491 X |
| 4,586,552 | 5/1986 | Labelle . | |
| 4,745,016 | 5/1988 | Hashimoto et al. | 49/497 X |
| 4,771,816 | 9/1988 | Clay, Jr. . | |
| 4,843,759 | 7/1989 | Kisanuki et al. | 49/490 X |

FOREIGN PATENT DOCUMENTS 1357006 6/1974 United Kingdom ................. 49/497

Primary Examiner—Philip C. Kannan
Assistant Examiner—Jerry Redman
Attorney, Agent, or Firm—Harness, Dickey & Pierce

[57] ABSTRACT

The present invention is a weather seal adapted to be secured on a flange of a vehicle to seal a gap between the flange and a panel member. The weather seal includes retaining members for retaining the weather seal on the flange and a trim lip for sealing the gap between the flange and panel member. The weather seal also includes a lip repositioning device for repositioning the trim lip to seal the gap when the trim lip is disposed in the gap.

5 Claims, 2 Drawing Sheets

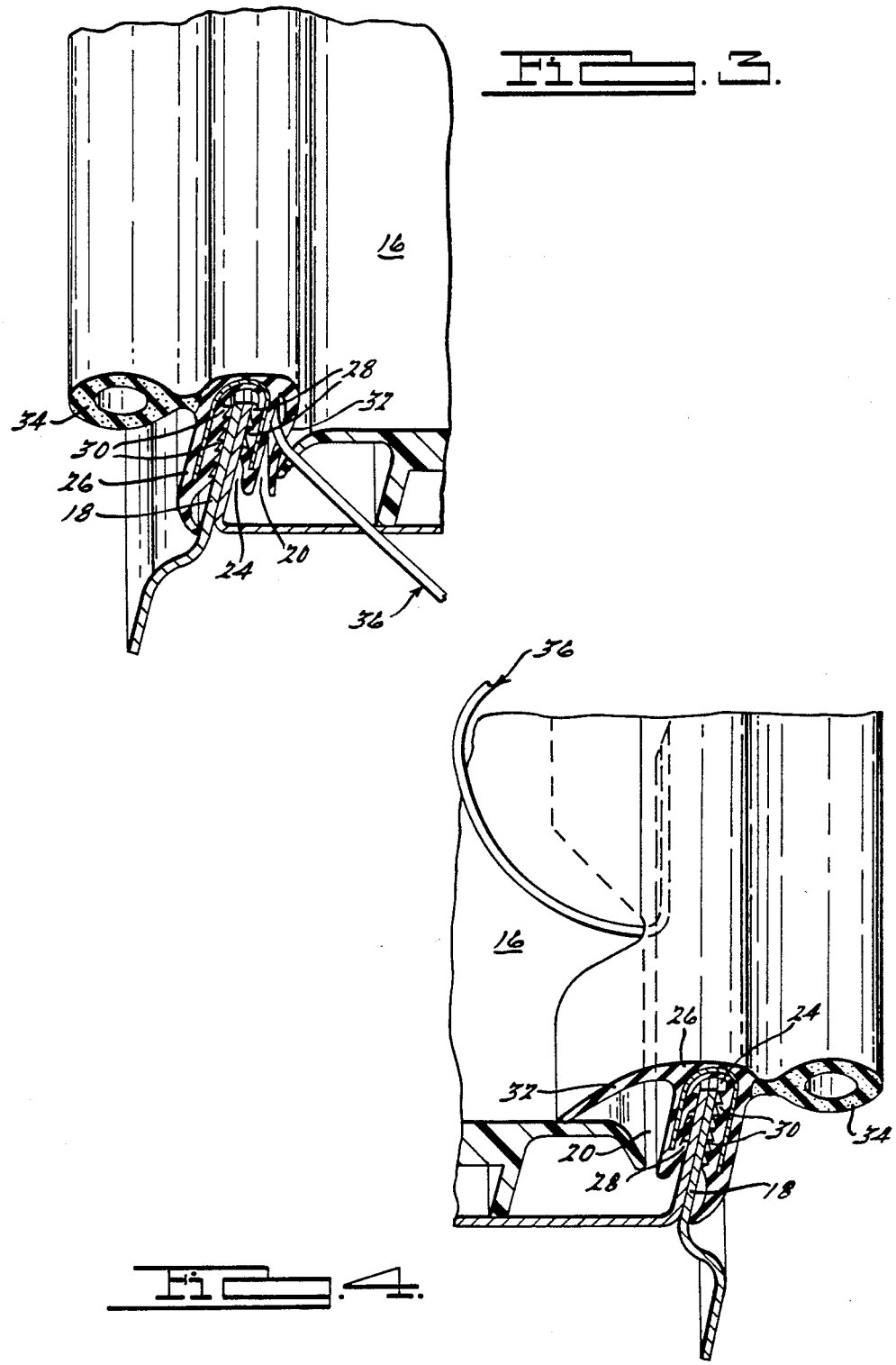

– 4,976,068 –

REPOSITIONING DEVICE FOR A WEATHER SEAL

BACKGROUND OF THE INVENTION

1. Field of the Invention

The present invention relates generally to weather seals, and more particularly to, a weather seal for a door on an automotive vehicle.

2. Description of Related Art

Typically, a weather seal is used on a flange surrounding a door opening to conceal or close a gap between a panel member such as a trim panel and a flange of the door opening on an automotive vehicle. Generally, the weather seal has a U-shaped core member having an outer skin surrounding the interior and exterior of the core member. The outer skin has inwardly projecting retaining members extending within a channel defined by the core member which are adapted to grip or couple with the flange of the door opening to retain the weather seal to the flange. A trim lip or, in some cases, a sealing lip extends outwardly from one side of the exterior of the outer skin. Additionally, a tubular member may extend outwardly from the other side of the exterior of the outer skin to form a seal with the door.

One disadvantage of the above weather seal is that the trim lip may become disposed in the gap between the flange and trim panel. This may occur when the weather seal is installed after the trim panel is in place on the vehicle or when the weather seal is installed on the flange and the trim panel is subsequently installed on the vehicle. As a result, additional time and monies may be expended to manually remove the trim lip from the gap and reposition the trim lip to cover the gap and contact the trim panel. Another disadvantage is that if the trim lip is not repositioned, an unpleasing aesthetic appearance results.

SUMMARY OF THE INVENTION

It is, therefore, one object of the present invention to provide a means for repositioning the trim lip if the trim lip is disposed in the gap between a flange and a panel member.

It is another object of the present invention to provide an improved weather seal for a door on an automotive vehicle.

To achieve the foregoing objects, the present invention is a weather seal adapted to be secured on a flange of a vehicle to seal a gap between the flange and a planel member. The weather seal includes means for retaining the weather seal on the flange and means for sealing the gap between the flange and panel member. The weather seal also includes means for repositioning the sealing means to seal the gap when the sealing means is disposed in the gap.

One advantage of the present invention is that the lip repositioning device allows for repositioning of the trim lip to the desired position to cover or seal the gap if the trim lip is disposed in the gap. Another advantage of the present invention is that the lip repositioning device is detachably secured to the weather seal to allow for removal once the trim lip has been repositioned. A further advantage of the present invention is that the lip repositioning device requires less time and money expended to reposition the trim lip.

Other advantages, features and objects of the present invention will be readily appreciated as the same becomes better understood after reading the following description in light of the accompanying drawings.

BRIEF DESCRIPTION OF THE DRAWINGS

FIG. 3 is an enlarged perspective view of circle 3 of the weather seal of FIG. 1.

FIG. 4 is an enlarged perspective view of circle 4 of the weather seal of FIG. 1.

DESCRIPTION OF THE PREFERRED EMBODIMENT

Figure 1:
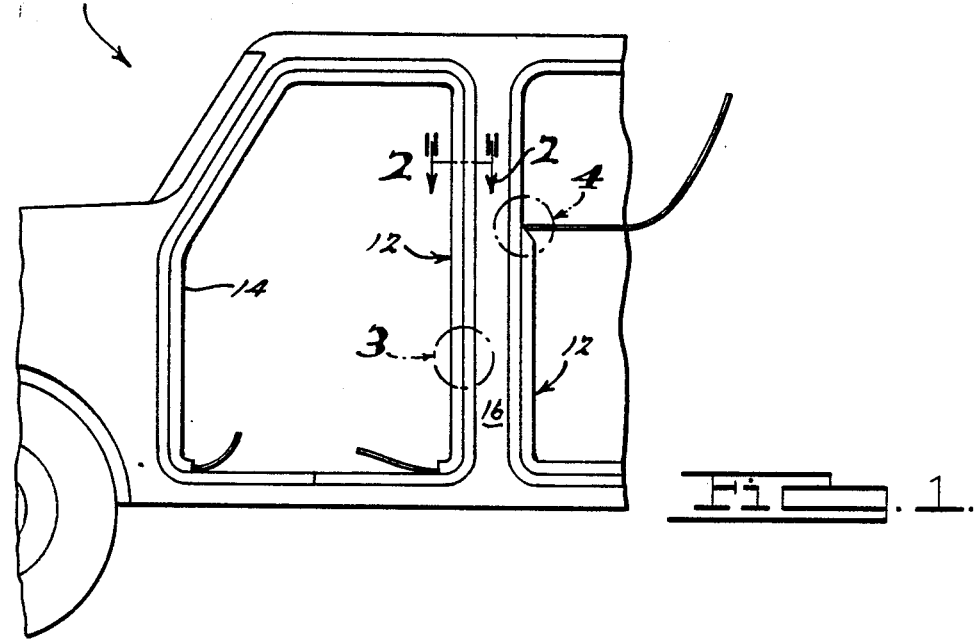
FIG. 1 is a partial side view of an automotive vehicle including a weather seal according to the present invention.

Referring to FIG. 1, an automotive vehicle 10 is shown with a weather seal, according to the present invention, generally illustrated at 12. The vehicle 10 includes a door opening 14 to contain a door (not shown). The vehicle 10 also includes a panel member 16 such as a trim panel disposed adjacent the door opening 14.

Figure 2:
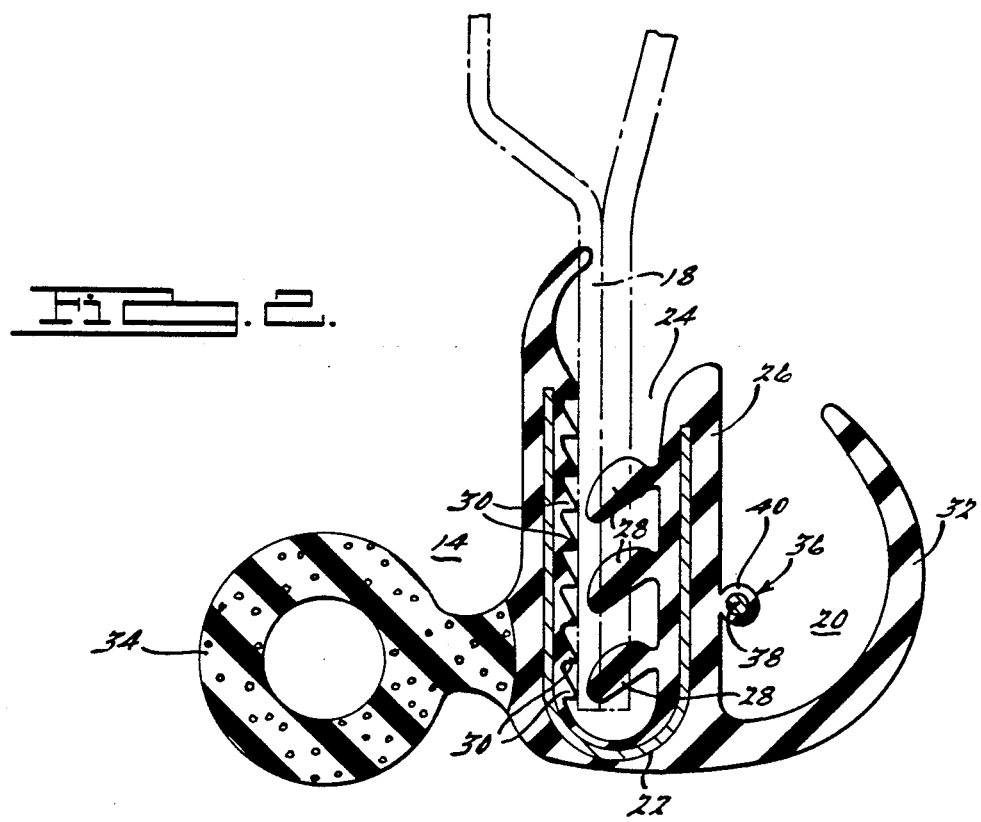
FIG. 2 is a sectional view taken along line 2—2 of FIG. 1.

Referring to FIGS. 2 and 3, the vehicle 10 includes a flange 18 peripherally extending into the door opening 14. A gap 20 is disposed between the flange 18 and the panel member 16. The weather seal 12 couples with or grips the flange 18 to close or seal the gap 20 and conceal the gap 20 from external view.

The weather seal 12 includes a core member 22 formed to a generally U-shaped configuration to define a channel 24. The core member 22 is made of a metallic material. The weather seal 12 also includes an outer skin 26 extruded from a polymeric material such as EPDM and surrounding the interior and exterior of the core member 22. A plurality of retaining members 28 and 30 extend from the outer skin 26 and inwardly into the channel 24. The retaining members 28 and 30 grip or couple with the flange 18 to retain the weather seal 12 onto the flange 18. A trim or sealing lip 32 extends outwardly from one side of the outer skin 26 to close or seal the gap 20 when the weather seal 12 is installed onto the flange 18. The trim lip 32 has a generally arcuate shape. Additionally, a tubular member 34 made of a sponge material may extend outwardly from the other side of the outer skin 26 to contact or sealingly engage a door. It should be appreciated that up to this point in the description the weather seal is conventional in construction.

The weather seal 12 includes a lip repositioning member, generally indicated at 36, attached to the exterior of the outer skin 26 below the trim lip 32. The lip repositioning member 36 includes a generally circular reinforcement cord 38 extending longitudinally. The reinforcement cord 38 is covered or encapsulated with a cover member 40 made of a polymeric material and attached to the outer skin 26. The lip repositioning member 36 extends longitudinally beyond the end of the weather seal 12. The lip repositioning member 36 is coextruded with the outer skin 26 and is removably or detachably secured to the weather seal 12. The excess length of the lip repositioning member 36 is pulled outwardly toward the trim lip 32 to reposition the trim lip 32 such that it covers or extends over the gap 20 to contact or rest on the panel member 16.

In operation, the weather seal 12 may be installed on the flange 18 either before or after the panel member 16 is secured in place on the vehicle 10. The flange 18 is disposed in the channel 24 of the weather seal 12 and the retaining members 28 and 30 grip the flange 18 to secure the weather seal 12 to the flange 18. The trim lip 32 may be disposed in the gap 20 between the flange 18 and panel member 16 as illustrated in FIG. 3. If this occurs, the excess length of the lip repositioning member 36 is pulled outwardly toward the trim lip 32. As a result, the trim lip 32 is pulled outwardly and removed from the gap 20. As the lip repositioning member 36 travels longitudinally along the trim lip 32, the trim 32 returns to a normal position to cover or close the gap 20 and rest or contact the panel member 16 as illustrated in FIG. 4. The lip repositioning member 36 may then be discarded. Accordingly, the present invention provides a simple and inexpensive device to correctly reposition the trim lip when disposed undesirably in a gap between the flange and panel member.

The present invention has been described in an illustrative manner. It is to be understood that the terminology which has been used is in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A weather seal adaped to be secured on a flange of a vehicle to seal a gap between the flange and a panel member, comprising:
   means for retaining said weather seal on the flange;
   means for sealing the gap between the flange and the panel member;
   said sealing means comprising a trim lip extending outwardly from said retaining means;
   means for repositioning said sealing means to seal the gap when the sealing means is disposed in the gap; and
   said repositioning means comprising a lip repositioning member detachably secured to said retaining means below said trim lip.

2. A weather seal adapted to be secured on a flange of a vehicle to seal a gap between the flange and a panel member, comprising:
   a core member configured to define a channel;
   an outer skin disposed about interior and exterior of said core member;
   a plurality of retaining members extending from said outer skin and inwardly into said channel to secure said weather seal to the flange;
   a trim lip extending outwardly from one side of an exterior of said outer skin; and
   means for repositioning said trim lip to seal the gap when said trim lip is disposed in the gap, said repositioning means being secured to said outer skin below said trim lip.

3. A weather seal adapted to be secured on a flange of a vehicle to seal a gap between the flange and a panel member, comprising:
   a core member configured to define a channel;
   an outer skin disposed about interior and exterior of said core member;
   a plurality of retaining members extending from said outer skin and inwardly into said channel to secure said weather seal to the flange;
   a trim lip extending outwardly from one side of an exterior of said outer skin;
   means for repositioning said trim lip to seal the gap when said trim lip is disposed in the gap; and
   said repositioning means comprising a lip repositioning member detachably secured to said retaining means below said trim lip.

4. A weather seal adapted to be secured on a flange of a vehicle to seal a gap between the flange and a panel member, comprising:
   a core member configured to define a channel;
   an outer skin disposed about interior and exterior of said core member;
   a plurality of retaining members extending from said outer skin and inwardly into said channel to secure said weather seal to the flange;
   a trim lip extending outwardly from one side of an exterior of said outer skin;
   means for repositioning said trim lip to seal the gap when said trim lip is disposed in the gap; and
   said lip repositioning member comprising a reinforcement cord extending longitudinally and a cover member disposed about said reinforcement cord and detachably secured to said outer skin.

5. A weather seal adapted to be secured on a flange of a vehicle to seal a gap between the flange and a panel member, comprising:
   a core member configured to define a channel;
   an outer skin disposed about interior and exterior of said core member;
   a plurality of retaining members extending from said outer skin and into said channel to secure said weather seal to the flange;
   a trim lip extending outwardly from one side of an exterior of said outer skin;
   means for repositioning said trim lip to seal the gap when said trim lip is disposed in the gap; and
   said repositioning means comprising a reinforcement cord extending longitudinally and a cover member disposed about said reinforcement cord and detachably secured to said outer skin.

* * * * *

UNITED STATES PATENT AND TRADEMARK OFFICE
CERTIFICATE OF CORRECTION

PATENT NO. : 4,976,068

DATED : December 11, 1990

INVENTOR(S) : James F. Keys

It is certified that error appears in the above-identified patent and that said Letters Patent is hereby corrected as shown below:

Column 1, line 50, "planel" should be --panel--.

Column 3, line 10, after "trim" second occurrence, insert --lip--.

Column 3, line 28, "adaped" should be --adapted--.

Signed and Sealed this

Seventeenth Day of November, 1992

*Attest:*

DOUGLAS B. COMER

*Attesting Officer*  *Acting Commissioner of Patents and Trademarks*